United States Patent
Heise

(10) Patent No.: US 8,752,908 B2
(45) Date of Patent: Jun. 17, 2014

(54) PARKING BRAKE SYSTEM FOR MOTOR VEHICLES

(75) Inventor: Andreas Heise, Erzhausen (DE)

(73) Assignee: Continental Teves AG & Co. oHG (DE)

( * ) Notice: Subject to any disclaimer, the term of this patent is extended or adjusted under 35 U.S.C. 154(b) by 942 days.

(21) Appl. No.: 12/306,043

(22) PCT Filed: Jun. 27, 2007

(86) PCT No.: PCT/EP2007/056426
§ 371 (c)(1),
(2), (4) Date: Dec. 22, 2008

(87) PCT Pub. No.: WO2008/000769
PCT Pub. Date: Jan. 3, 2008

(65) Prior Publication Data
US 2009/0200124 A1    Aug. 13, 2009

(30) Foreign Application Priority Data

Jun. 27, 2006 (DE) .......................... 10 2006 029 787
Jun. 26, 2007 (DE) .......................... 10 2007 029 632

(51) Int. Cl.
*B60T 13/74* (2006.01)

(52) U.S. Cl.
USPC .................... 303/20; 303/122.04; 303/DIG. 9

(58) Field of Classification Search
USPC ............. 303/20, 155, 122.04, 122.05, DIG. 9
See application file for complete search history.

(56) References Cited

U.S. PATENT DOCUMENTS

| | | | |
|---|---|---|---|
| 6,256,570 B1 * | 7/2001 | Weiberle et al. | 701/70 |
| 6,296,325 B1 * | 10/2001 | Corio et al. | 303/20 |
| 6,969,127 B2 * | 11/2005 | Suzuki et al. | 303/20 |
| 8,182,050 B2 * | 5/2012 | Jackson et al. | 303/192 |
| 2001/0023799 A1 | 9/2001 | Engelhard | |
| 2001/0045771 A1 * | 11/2001 | Corio et al. | 303/20 |
| 2003/0226727 A1 | 12/2003 | Laurent | |
| 2004/0239173 A1 * | 12/2004 | Williams et al. | 303/3 |
| 2006/0152080 A1 * | 7/2006 | Chico et al. | 303/191 |
| 2010/0280725 A1 * | 11/2010 | Cahill | 701/70 |
| 2012/0145490 A1 * | 6/2012 | Clary et al. | 188/1.11 E |

FOREIGN PATENT DOCUMENTS

| | | |
|---|---|---|
| DE | 100 25 731 A1 | 12/2000 |
| DE | 100 06 656 C1 | 6/2001 |
| EP | 1 026 060 A2 | 2/2000 |
| EP | 1 361 124 A1 | 11/2003 |
| EP | 1 418 103 A1 | 11/2003 |
| EP | 1 439 102 A1 | 1/2004 |

* cited by examiner

*Primary Examiner* — Bradley King
(74) *Attorney, Agent, or Firm* — RatnerPrestia

(57) ABSTRACT

A parking brake system for a motor vehicle comprising a control element and at least two electromechanical actuators. Each electromechanical actuator is configured for generating a parking brake force at one wheel of the motor vehicle. The electromechanical actuators are each provided with wheel electronic systems. The control element is connected via a brake controller to the wheel electronic system of a first electromechanical actuator by at least a first signal line. The control element is connected via a brake controller to the wheel electronic system of a second electromechanical actuator by a second signal line. At least a third signal line connects the control element directly to the wheel electronic systems or to one of the electromechanical actuators to convey a driver's request.

12 Claims, 6 Drawing Sheets

PARKING BRAKE SYSTEM FOR MOTOR VEHICLES

CROSS REFERENCE TO RELATED APPLICATIONS

This application is the U.S. national phase application of PCT International Application No. PCT/EP2007/056426, filed Jun. 27, 2007, which claims priority to German Patent Application No. DE102006029787.3, filed Jun. 27, 2006 and German Patent Application No. DE102007029632.2, filed Jun. 26, 2007, the contents of such applications being incorporated by reference herein.

BACKGROUND OF THE INVENTION

1. Field of the Invention

The present invention relates to a parking brake system for motor vehicles having a control element and at least two electromechanical actuators for generating a parking brake force at in each case one wheel of the motor vehicle.

2. Description of the Related Art

DE 100 06 626 C1 discloses a parking brake system for motor vehicles, in which a control element is connected via a first signal line to a first controller and via a second signal line to a second controller. In the previously known parking brake system, there is also provision that the first controller is connected via a further, third signal line to the second controller, wherein a parking brake request, signaled by activating the control element, is conveyed from the first controller to the second controller via the third signal line. Since each controller drives an electromechanical actuator, the parking brake system can no longer be operated satisfactorily if one of the two controllers falls.

An object of the present invention is therefore to improve a parking brake system of the generic type mentioned at the beginning in such a way that defects do not affect the functionality of the parking brake system, and the failsafety is enhanced further.

SUMMARY OF THE INVENTION

This object is achieved according to aspects of the invention in that at least a third signal line is provided which connects the control element directly to the wheel electronic systems or respectively to one of the electromechanical actuators and conveys the driver's request. Here, the third signal line is embodied in such a way that, on the one hand, it connects the control element directly to the wheel electronic systems of the electromechanical actuators, and, on the other hand, connects the two wheel electronic systems to one another and permits communication between the wheel electronic systems. This ensures that at least three independent information lines and data paths with information relating to the putting on and release of the parking brake are provided, and these three information items are fed in the fault-free state to each wheel electronic system of the electromechanical actuators via different data paths.

The present invention therefore provides a system which, compared to the known concepts, permits considerably greater availability with an extremely simple and favorable structural concept. "Greater availability" is understood to mean that the parking brake is to be as far as possible always capable of operating.

In one advantageous development, a fourth signal line is provided which connects the two wheel electronic systems of the electromechanical actuators directly to one another and permits communication. The wheel electronic systems of the electromechanical actuators have here a means for generating a majority decision. This means is preferably not formed by the microcontroller but is rather formed by a separate component.

There is provision here that the signals of the control element which are fed to the wheel electronic systems are connected to an OR logic element, and the electromechanical actuators are driven in accordance with the majority decision, i.e. the microcontroller of the wheel electronic system cannot implement a control operation of the electromechanical actuator until at least two of the signal lines request activation or release of the parking brake.

A particularly advantageous development provides that the wheel electronic system is supplied with the output signal of a wheel speed sensor which is located on the same wheel.

There is provision that the wheel electronic system contains at least one microprocessor, wherein redundant or redundant core microprocessors are used as the microprocessor in the wheel electronic systems.

In one preferred embodiment of the invention, the control element is equipped with at least three channels, and it outputs the driver's request in the form of at least three switching information items. The control element is supplied and/or evaluated from the brake controller or from the further controller. The control element has preferably electronic semiconductor components.

In a further advantageous development of the subject matter of the invention, a redundant power supply of the parking brake system is provided. Here, the redundant power supply is formed by two batteries together with a charging circuit. Alternatively, the redundant power supply is formed by a management system for a vehicle on-board voltage supply.

BRIEF DESCRIPTION OF THE DRAWINGS

The invention will be explained in more detail below on the basis of two exemplary embodiments and with reference to the appended drawing, in which.

DETAILED DESCRIPTION OF THE PREFERRED EMBODIMENTS

Figure 1:
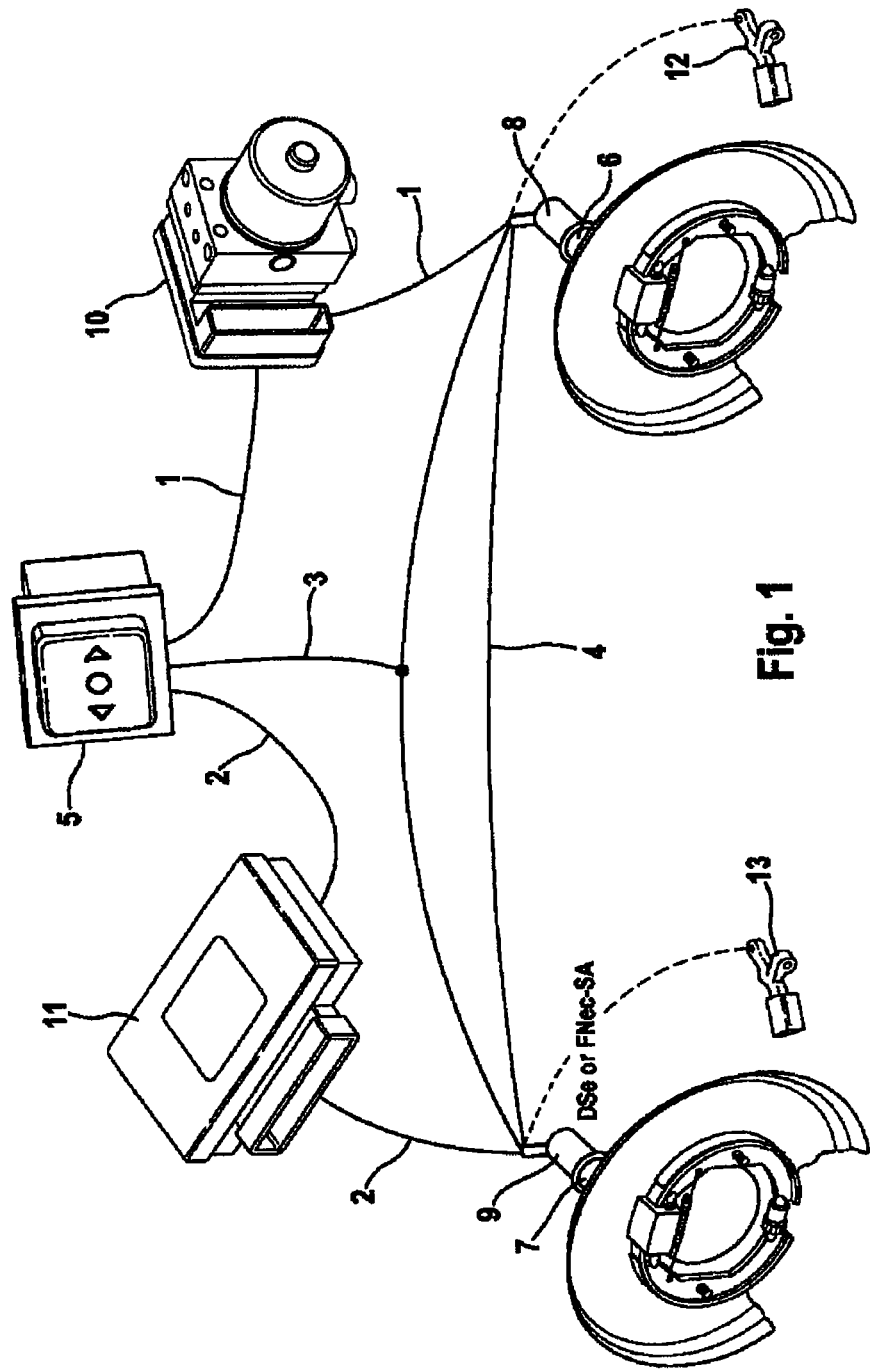
FIG. 1 is a simplified illustration of the structure of the parking brake system according to aspects of the invention.

The parking brake system which is illustrated in FIG. 1 has, on two wheels of the rear axle, a parking brake which can be activated electromechanically and which is explained below by way of example with reference to FIG. 2. The present invention can be used both for parking brake systems whose parking brakes which can be activated electromechanically act on a disk brake as well as for systems with parking brakes which act on a drum brake. The system can also be used when there are other types of friction or latching mechanisms which serve to lock wheels.

Figure 2:
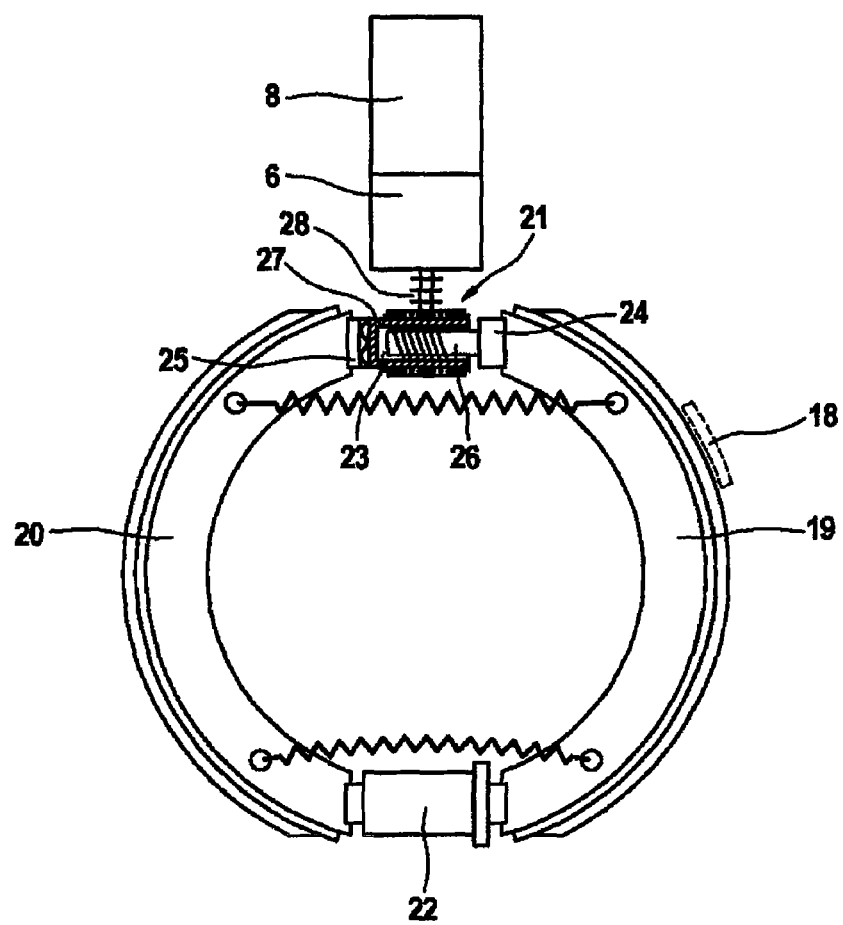
FIG. 2 is a schematic illustration of an electromechanical actuator with a wheel electronic system.

A parking brake which can be activated electromechanically, and which is composed essentially of a drum brake which is known per se and is of the "duo-servo" type as well as an electromechanical actuator 6, is described by way of example on the basis of FIG. 2. The drum brake of the "duo-servo" type has an only partially illustrated brake drum 18, a pair of brake calipers 19, 20 which are provided with friction faces, and an expanding lock 21 which can cause the friction faces of the brake calipers 19, 20 to engage with the inner side of the brake drum 18.

A freely moving or float-mounted support device 22 which is located opposite the expanding lock 21 and is arranged between the brake calipers 19, 20 is characteristic of the drum brake of the "duo-servo" type. The abovementioned expanding lock 21 is formed essentially by a threaded nut-spindle arrangement 23 and two pressure elements 24, 25, the one pressure element 24 interacting with the spindle 26 and the other pressure element 14 interacting with the threaded nut 27. As is clarified in FIG. 2, the threaded nut-spindle arrangement 21 is activated by a helical gear 28 which is driven by the electromechanical actuator 6. For this purpose, the threaded nut 27 has, on the outer surface, a toothing which runs parallel to the axis of the threaded nut 27. With this straight toothing of the threaded nut 27, the abovementioned helical gear 28 forms a helical gear mechanism. When the helical gear 28 is activated by the electromechanical actuator 6, the threaded nut 27 is made to rotate. Owing to this rotational movement of the threaded nut 27, the spindle 26 of the threaded nut-spindle arrangement 23 carries out a translational movement and causes the two brake calipers 29, 20 to engage with the brake drum 18 with the desired engagement force.

In order to be able to carry out a parking brake operation, either a step-down gear mechanism (not illustrated) or the threaded nut-spindle arrangement 23 is of self-locking design. As a result of this measure, the brake calipers 19, 20 remain in engagement with the brake drum 18 in the currentless state of the electromechanical actuator 6.

As is also apparent from FIG. 2, a wheel electronic system 8 is assigned to the electromechanical actuator 6. This wheel electronic system 8 is composed of a power electronic system an open-loop and closed-loop controller. The wheel electronic system 8 is used, on the one hand, to control and switch the electrical energy supplied to the electromechanical actuator 6 and, on the other hand, to process the supplied signals.

The parking brake system which is illustrated in FIG. 1 has, on the two wheels of the rear axle of the motor vehicle, an electromechanical actuator 6, 7 and a respectively assigned wheel electronic system 8, 9. In order to convey the driver's request, a control element 5 is provided which is equipped with three channels and outputs the driver's request in the form of three switching information items. The output signals of the control element 5 are supplied via a first signal line 1 to a brake controller 10 and are passed on to the wheel electronic system 8 of the first electromechanical actuator 6 which is located on the rear right-hand wheel. The output signals of the control element 5 are supplied via a second signal line 2 to a further controller 11. This further controller 11 is formed, for example, by a chassis control module which comprises control devices and a triggering sensor system for airbags and vehicle occupant monitoring systems. The output signals of the control element 5 are passed on from this further controller 11 to the wheel electronic system 9 of the second electromechanical actuator 7 which is located on the rear left-hand wheel. Furthermore, a third signal line 3 is provided which connects the control element 5 directly to the wheel electronic systems 8, 9 and supplies the output signals of the control element 5 directly to the wheel electronic systems 8, 9. As illustrated in FIG. 1, this third signal line is embodied in a star shape, i.e. on the one hand it connects the control element 5 directly to the wheel electronic systems 8, 9 and on the other hand it connects the two wheel electronic systems 8, 9 to one another in order to permit communication between the wheel electronic systems 8, 9. Furthermore, a fourth signal line 4 is provided which is provided exclusively for connecting the two wheel electronic systems 8, 9 in order to permit communication between these two wheel electronic systems 8, 9.

This design which is tolerant to "simple faults" results in improved system availability since three independent information lines 1, 2, 3 or 4 are fed to each wheel electronic system 8, 9. In the case of simple faults—relating to the cabling, the further controller 11, the brake controller 10 or the control element 5—the present parking brake system is still fully functionally operational and the driver can be warned about the fault which has occurred. In the event of a fault in an electromechanical actuator 6, the other electromechanical actuator 7 remains fully functionally operational independently of the latter. A diagnostic capability of defects which occur is also provided. In the event of a fault in the connecting lines 1, 2, 3 full diagnostics can still be carried out on the system, and even in the event of a failure of one of the control devices 10, 11 the parking brake is still fully available. In the event of a failure of an electromechanical actuator 8 (it is not possible to put it on any more), the remaining electromechanical actuator 9 can still reliably perform a parking function and a release function.

Figure 3:
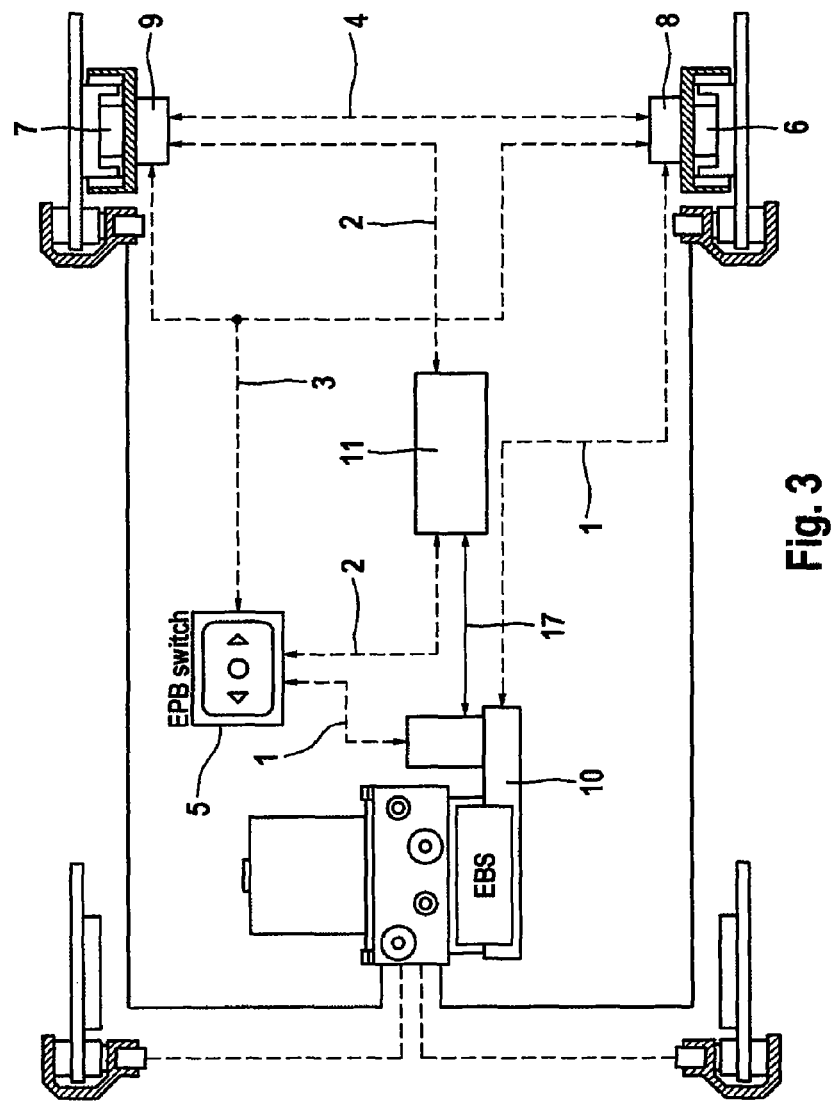
FIG. 3 is an illustration of the system layout of the parking brake system according to FIG. 1.

As is illustrated in FIG. 3, a communication path is provided between the control devices 10 and 11 via a CAN or Flexray data bus 17. Since there is also a further communication path to a respective electromechanical actuator 6, 7 via the signal lines 1, 2, and there is a communication path between the electromechanical actuator 6, 7 via the signal line 4, and there is a further connection from the control element 5 to the wheel electronic systems via the signal line 3, normal operation of the system is respectively still possible in the case of simple faults in one of the connecting lines 1, 2, 3, 4, the control element 5, a control device 10, 11 or with restrictions of an electromechanical actuator 6, 7. Only a fault display is useful and prescribed. The driver is informed about faults which occur.

Figure 4:
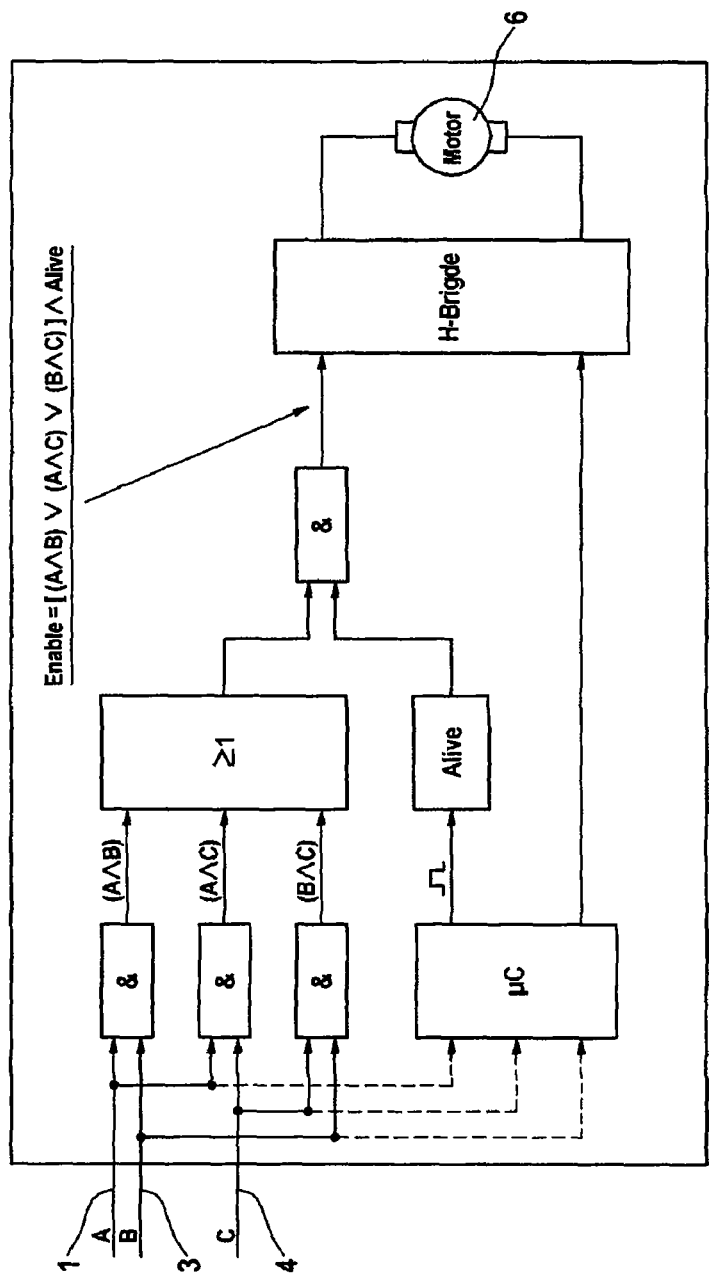
FIG. 4 is a schematic partial illustration of the structure of the wheel electronic system.

As is apparent from the system layout in FIG. 3, at least two signals of the control element 5 are supplied to each wheel electronic system 8, 9: the driver's request is supplied via the first signal line 1 to the wheel electronic system 8 on the right-hand wheel of the motor vehicle, and via the third signal line 3 the brake controller ECU 10. In addition, a third signal can be supplied by the other wheel electronic system 9 via the communications line 4, said third signal having been received by said wheel electronic system 9 via the second signal line 2 and the further controller 11. The same applies correspondingly to the signals of the control element 5 which are supplied to the wheel electronic system 9 on the left wheel. For safety reasons, there are therefore always at least two independent, unambiguous requests by the driver of the vehicle present in order to activate the electromechanical actuator 6, 7. With the described supply of a third signal, a majority decision takes place in the wheel electronic systems 8, 9, as illustrated in FIG. 4. FIG. 4 shows schematically how such a majority decision operates in the wheel electronic system 8 on the rear right-hand wheel of the motor vehicle. The signal lines 1, 3, 4 are connected to an OR logic element, and the electromechanical actuator 6 is driven in accordance with the majority decision. The wheel electronic systems 8, 9 contain at least one microprocessor which is embodied as a redundant or redundant core microprocessor.

Figure 5:
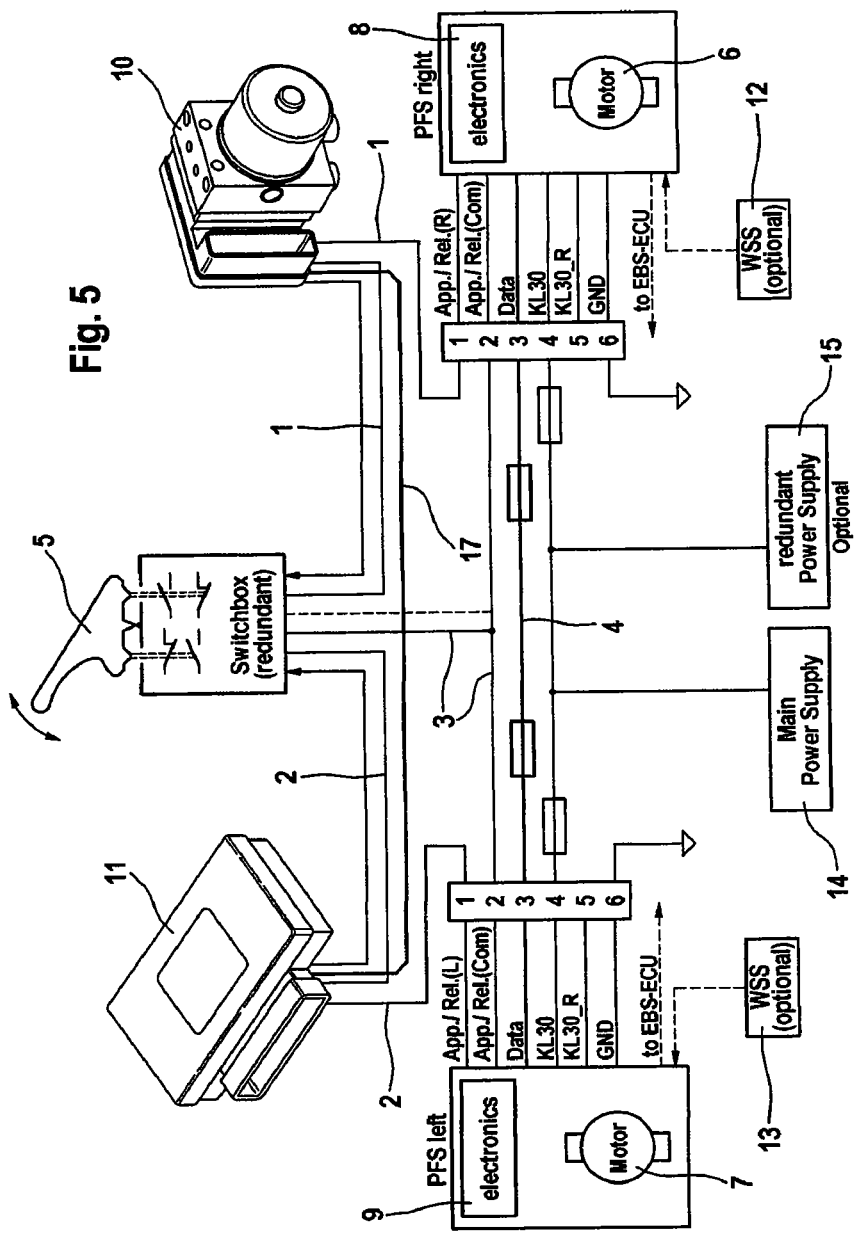
FIG. 5 is a schematic illustration of the structure of the parking brake system according to FIG. 1 with two batteries for supplying electrical energy.
Figure 6:
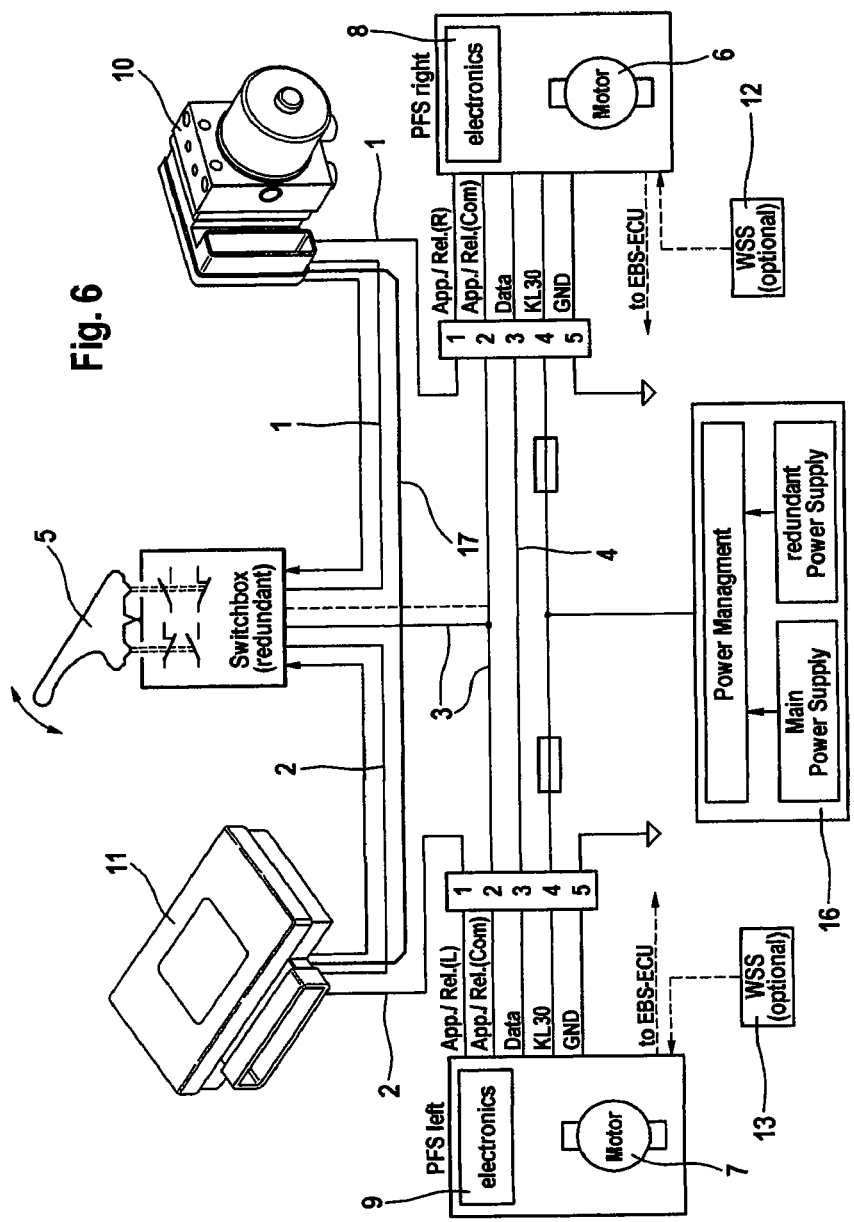
FIG. 6 is a further schematic illustration of the structure of the parking brake system according to FIG. 1 with a management system for a vehicle on-board voltage supply.

An expanded circuit diagram is illustrated in FIG. 5. If a redundant power supply is provided for the described features, the functionality of the parking brake system can also be completely provided in the event of a failure of a power supply. For this purpose, two batteries 14, 15, which form the redundant power supply of the system, are illustrated in FIG. 5. The maximum availability can be achieved by supplying the system with two independent batteries 14, 15 or an electrical supply line which is led to the wheels to which the parking brake has been applied, via a battery management system 16, as illustrated in FIG. 6.

The supply to the redundant control element 5 can preferably also be provided from the control devices 10, 11. It has electronic semiconductor components.

In each case the output signal of a wheel speed sensor 12, 13, which is located on the same wheel as the wheel electronic system 8, 9, is supplied to the wheel electronic system 8, 9. Through the communication via the direct line 4 between the wheel electronic systems 8, 9, a "redundant" driving or stationary state detection can be carried out, which detection permits release or even dynamic braking to be determined even if one of the control devices 10, 11 fails. The wheel speed sensor 12, 13 supplies the information about the movement of the wheels directly to the wheel electronic system 8, 9. The wheel speed information of the wheel speed sensors 12, 13 is reconciled by means of the communication between the two wheel electronic systems 8, 9.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A parking brake system for a motor vehicle comprising:
   a parking brake control element;
   at least two parking brake electromechanical actuators, each parking brake electromechanical actuator being configured for generating a parking brake force at one wheel of the motor vehicle, wherein the parking brake electromechanical actuators are each provided with parking brake wheel electronic systems, and wherein the parking brake control element is connected via a parking brake controller to the parking brake wheel electronic system of a first parking brake electromechanical actuator of the at least two parking brake electromechanical actuators by at least a first parking brake signal line and the parking brake control element is connected to the parking brake wheel electronic system of a second parking brake electromechanical actuator of the at least two parking brake electromechanical actuators by a second parking brake signal line,
   wherein at least a third parking brake signal line connects the parking brake control element directly to the parking brake wheel electronic systems or to one of the parking brake electromechanical actuators to convey a driver's parking brake request, wherein the third signal line connects the control element directly to the wheel electronic system of each electromechanical actuator and connects the wheel electronic systems to one another to facilitate communication between the wheel electronic systems,
   wherein the parking brake control element is equipped with at least three parking brake channels, and the parking brake control element outputs a driver's parking brake request in the form of at least three switching information items, and
   wherein a fourth signal line connects the wheel electronic systems of the electromechanical actuators directly to one another to facilitate communication between the wheel electronic systems,
   wherein the first, second, third and fourth signals lines are independent from one another.

2. The parking brake system as claimed in claim 1, wherein each of the wheel electronic systems of the electromechanical actuators includes a means for generating a majority decision.

3. The parking brake system as claimed in claim 2, wherein the signals of the control element which are fed to the wheel electronic systems are connected to an OR logic element, and the electromechanical actuators are driven in accordance with the majority decision.

4. The parking brake system as claimed in claim 1, wherein each wheel electronic system is supplied with an output signal of a wheel speed sensor that is positioned on a wheel of the motor vehicle.

5. The parking brake system as claimed in claim 1, wherein each wheel electronic system contains at least one microprocessor.

6. The parking brake system as claimed in claim 5, wherein redundant or redundant core microprocessors are used as the microprocessor in the wheel electronic systems.

7. The parking brake system as claimed in claim 1, wherein the control element is (i) supplied from the brake controller or from a further controller, (ii) evaluated from the brake controller or from the further controller, or (iii) supplied and evaluated from the brake controller or from the further controller.

8. The parking brake system as claimed in claim 1, wherein the control element includes electronic semiconductor components.

9. The parking brake system as claimed in claim 1 further comprising a redundant power supply of the parking brake system.

10. The parking brake system as claimed in claim 9, wherein the redundant power supply is includes two batteries with a charging circuit.

11. The parking brake system as claimed in claim 9, wherein the redundant power supply includes a management system for a vehicle on-board voltage supply.

12. A parking brake system for a motor vehicle comprising:
    a parking brake control element;
    at least two parking brake electromechanical actuators, each parking brake electromechanical actuator being configured for generating a parking brake force at one wheel of the motor vehicle, wherein each parking brake electromechanical actuator is provided with a wheel electronic system,
    a first parking brake signal line connecting the parking brake control element to the wheel electronic system of a first parking brake electromechanical actuator of the at least two parking brake electromechanical actuators;
    a second parking brake signal line connecting the parking brake control element to the wheel electronic system of a second parking brake electromechanical actuator of the at least two parking brake electromechanical actuators; and
    a third parking brake signal line connecting the parking brake control element to both wheel electronic systems or to one of the parking brake electromechanical actuators to convey a driver's parking brake request,
    wherein the parking brake control element is equipped with at least three parking brake channels, and the parking brake control element outputs a driver's parking brake request in the form of at least three switching information items, wherein the third signal line connects the control element directly to the wheel electronic system of each electromechanical actuator and connects the wheel electronic systems to one another to facilitate communication between the wheel electronic systems, and wherein a fourth signal line connects the wheel electronic systems of the electromechanical actuators directly to one another to facilitate communication between the wheel electronic systems, wherein the first, second, third and fourth signals lines are independent from one another.

* * * * *